Jan. 31, 1928.

W. E. GLASPEY

1,657,921

MACHINE FOR MAKING GLASS CONTAINERS

Filed June 2 1927

Jan. 31, 1928.
W. E. GLASPEY
1,657,921
MACHINE FOR MAKING GLASS CONTAINERS
Filed June 2 1927
9 Sheets-Sheet 6

Jan. 31, 1928.

W. E. GLASPEY 1,657,921

MACHINE FOR MAKING GLASS CONTAINERS

Filed June 2, 1927 9 Sheets-Sheet 8

Inventor:
Warren E. Glaspey,
By Dyrenforth, Lee, Chritton & Wiles
Attys.

Jan. 31, 1928.  1,657,921

W. E. GLASPEY

MACHINE FOR MAKING GLASS CONTAINERS

Filed June 2, 1927  9 Sheets-Sheet 9

Inventor:
Warren E. Glaspey,
By Dyrenforth, Lee, Chritton & Wiles,
Attys.

Patented Jan. 31, 1928.

1,657,921

UNITED STATES PATENT OFFICE.

WARREN E. GLASPEY, OF NEW YORK, N. Y., ASSIGNOR TO SPRING STOPPER COMPANY OF NEW YORK, A CORPORATION OF DELAWARE.

MACHINE FOR MAKING GLASS CONTAINERS.

Application filed June 2, 1927. Serial No. 196,064.

This invention relates to improvements in machines for making glass containers, and more particularly glass containers provided with internally threaded mouth portions, adapted to receive threaded stoppers, and the like.

The invention is particularly applicable to the kind of machine generally known as the press and blow type.

The primary object of the invention is to adapt the machine of the press and blow type to the production of containers provided with internally threaded mouth portions; and the invention involves the combination with the mechanisms of a machine for pressing and blowing a container, of means cooperating with such mechanisms for producing internal threads in the mouths of the containers.

It may be stated preliminarily that in a machine of the general type referred to there is employed a table with a plurality of blank or parison moulds adapted to rotate about a central column. Adjacent the table with the parison moulds is a vertical shaft carrying a spider provided with a set of four plungers for pressing the glass in the parison moulds. The spider revolves so that a cool plunger is brought in line with each succeeding mould as the parison mould table revolves. To one side of the table carrying the parison moulds is another table with blow moulds, and means are provided for removing the parison mould and transferring it to a proper blow mould for completion of the forming process by air pressure. This general type of machine, as far as the pressing and blowing operations are concerned, and without considering the formation of internal threads in the mouths of the containers, forms no part of the present invention and consequently will not be described in detail here. This general type of press and blow machine is sometimes known as the "O'Neill".

My invention relates more particularly to the provision of means cooperating with a press and blow machine of the type described for producing internal threads in the mouths of the containers, and will be described more in detail hereinafter.

As shown in the drawings, 1 indicates a suitable base carrying the two vertical columns 2 and 3, 4 indicates a table with a plurality of blow molds 5 (here shown as eight) mounted to rotate about the column 2. The rotation of the table 4 is accomplished in a well-known manner by means of the gear 6 attached to its base.

7 indicates a table with a plurality of blank or parison moulds 8 (here shown as eight) mounted to rotate about the column 3. This table is driven by means of a gear 9 attached to its base.

10 indicates an intermediate gear between the gears 6 and 9 and meshing with both of them. A ratchet gear 11 is located immediately below the gear 10 and adapted to rotate the gear 10 and the shaft 12 in one direction. Motion is imparted by means of the rack piston 13 meshing with the ratchet gear 11 which is operated by air pressure in the cylinder 14 in a well-known manner.

A set of four plungers 15 for pressing glass in the blank or parison moulds is located in a spider 16 which revolves around the vertical shaft 17. A set of gears 18 meshing with the table gear 9 revolves the spider 16 so that a cool plunger is brought in line with each succeeding mould 8 as the blank table 7 revolves. Lifting cylinder 19 and pressing cylinder 20 furnish the means for lowering the plunger 15 into the corresponding mould 8, pressing the same, and then lifting the plunger out. These functions are performed in the well-known manner as embodied in machines of the character described.

Figure 12:
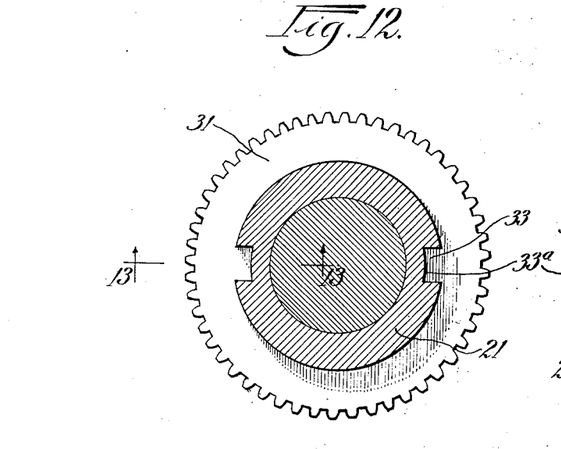
Fig. 12 is a horizontal sectional view taken as indicated by the line 12 of Fig. 7.
Figure 13:
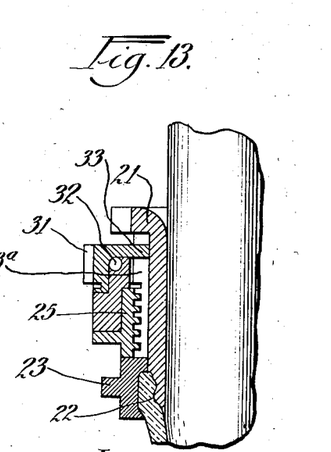
Fig. 13 is a view taken as indicated by the line 13 of Fig. 12.
Figures 14, 15, 16:
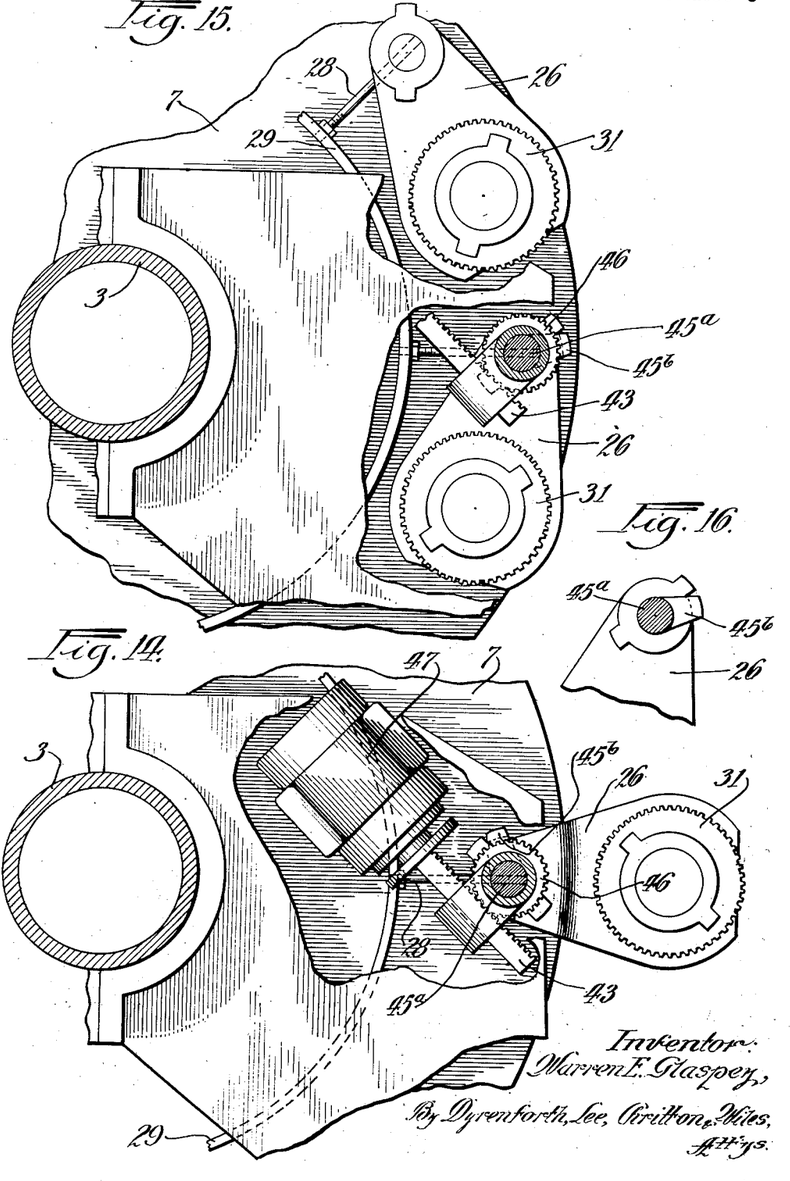
Fig. 14 is a view taken as indicated by the line 14—14 of Fig. 5.
Fig. 15 is a similar view showing the arm 26 turned away from its position over the mould.
Fig. 16 is a view taken as indicated by the line 16—16 of Fig. 5 showing the parts in the position indicated in Fig. 15.

I shall now describe more in detail the construction and operation of the mechanism for forming the internal threads in the neck portions of containers. 21 indicates a threaded sleeve equipped on its lower end with any desired male thread 22 and adapted to fit very accurately in the neck ring 23 of the parison mould. The threaded sleeve 21 is also designed to make an accurate fit around the plunger 15. The outer surface of the threaded sleeve 21, above the thread 22, is also provided with another thread 24 of equal pitch with the thread 22, and the thread 24 meshes with a female thread of like pitch in nut 25 which is securely attached to an arm 26 which is slidably and rotatably mounted on the pin 27. Locating pins 28 are inserted in the pins 27 and anchored to the ring 29 (see Fig. 5). A slot 30 in the hub of arm 26 fits neatly over the locating pin 28. 31 indicates a gear or pinion revolving on the ball race 32 and equipped with two lugs 33 (see Fig. 12) on its inner circumference adapted to fit in two grooves 33ᵃ on the outer surface of the threaded sleeve 21.

34 indicates a lifting cylinder with a disc head 35 on the end of its piston rod 35ᵃ (see Fig. 5) adapted to lift the arm 26 by engagement with the lug or flange 36. The piston rod in cylinder 34 extends through the upper head of the cylinder and forms the slide valve 37 which controls the air pressure from port 38 to port 39.

Figure 1:
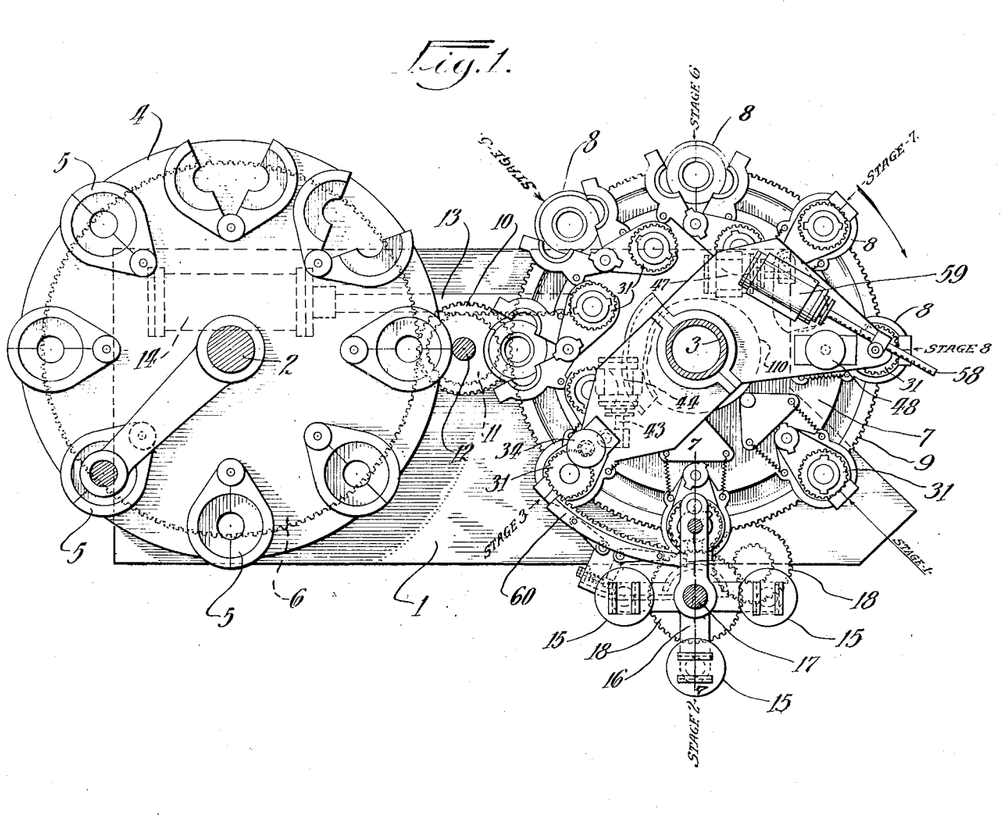
Fig. 1 is a top plan view of the complete machine.
Figure 7:
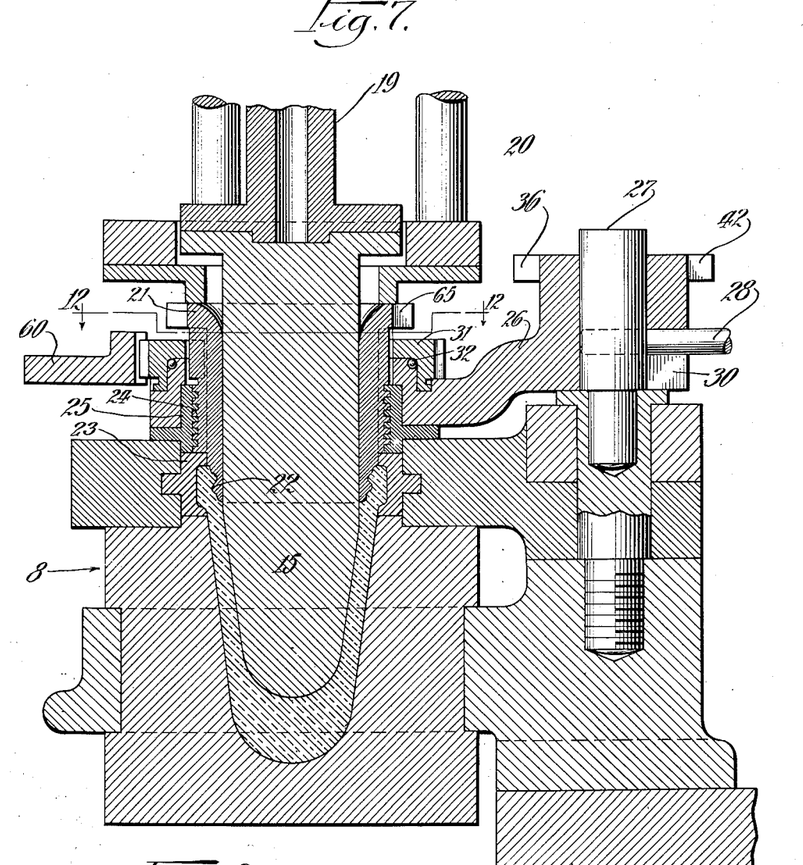
Fig. 7 is an enlarged view taken as indicated by the line 7 of Fig. 1 showing the parison mould with the inside screw attachment in place and the plunger in its pressing position, in cross-section.

A general description of some of the steps of operation at this point will make an understanding of the construction and operation more clear. The parison mould table moves one step at a time, thus requiring eight steps to complete its rotation. For convenience, these steps may be referred to as stages and, likewise for convenience, stage one will be called the stage when the molten glass is placed in the blank parison mould 8. For clarity, this stage is shown in Fig. 1, where the arrow indicates the direction of rotation of the table. After the parison mould has been filled with molten glass, the table turns one step, to stage two, to bring the mould under the plunger 15. This plunger 15 is then forced down by air pressure, the end of the plunger engaging the molten glass as shown in Fig. 7, forcing the glass up and around the threads 22. The molten glass requires but an instant to chill and remain in this shape. The plunger 15 is then withdrawn and the table moves one more step to the next stage.

Figure 4:
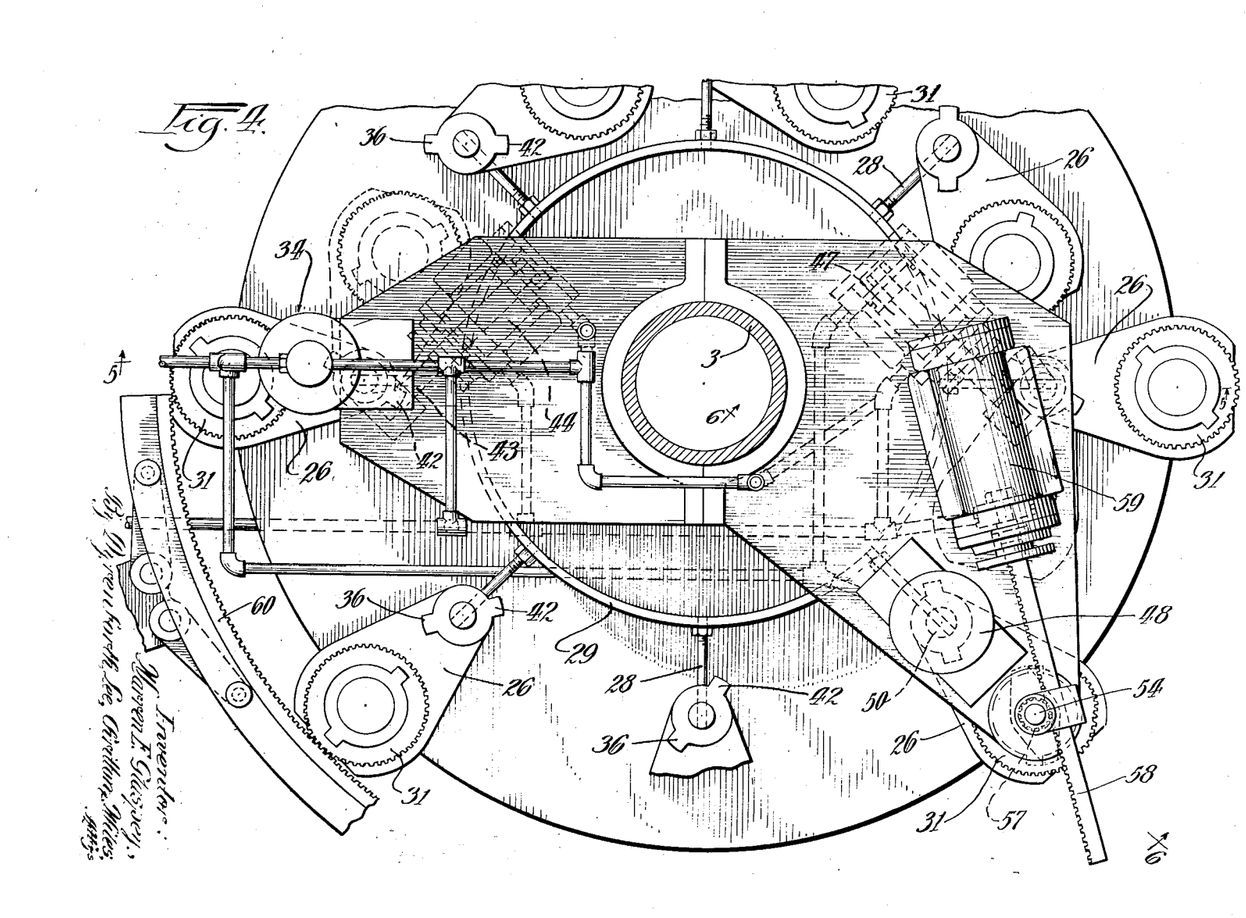
Fig. 4 is a top plan view, on an enlarged scale of the thread forming attachment showing the same clamped to the central column of the parison mould table.
Figure 5:
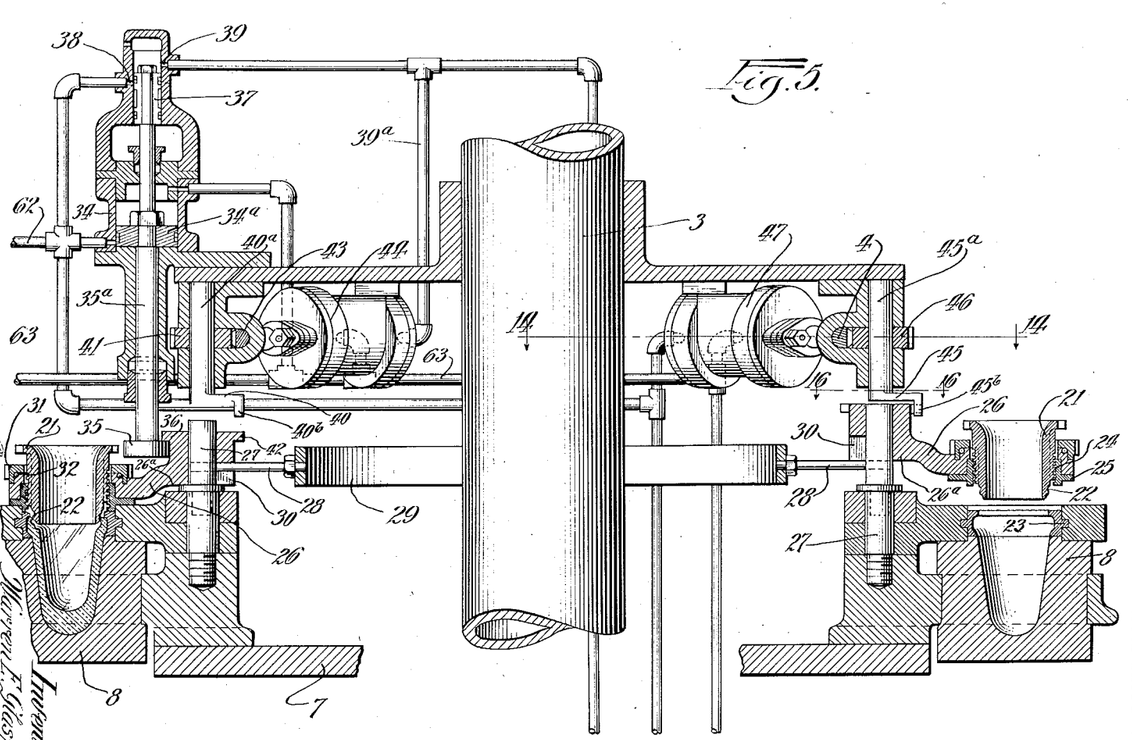
Fig. 5 is a view taken as indicated by the line 5—5 of Fig. 4.
Figure 8:
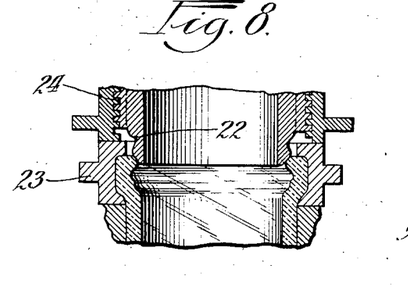
Fig. 8 is a fragmentary view similar to Fig. 7 showing the inside screw attachment, or threaded sleeve, raised from the parison.

60 indicates a curved rack bar (see Fig. 4) adapted to engage the teeth on gear 31 as the table moves from stage two to stage three and revolves said gear 31 in a counterclockwise direction. The lugs 33 on the internal surface of gear 31 act as splines and work in the slots 33ᵃ on the outer surface of the sleeve 21 to revolve it also in a counterclockwise direction. The threads 24 act as guides and operate in the nut 25 to raise the collar 21 and unscrew the threaded end 22 from the newly formed threads in the glass casting. By the time the mould has reached stage three the threaded sleeve 21 has been raised and the threads 22 completely unscrewed from the glass blank as shown in Figs. 5 and 8.

Figure 2:
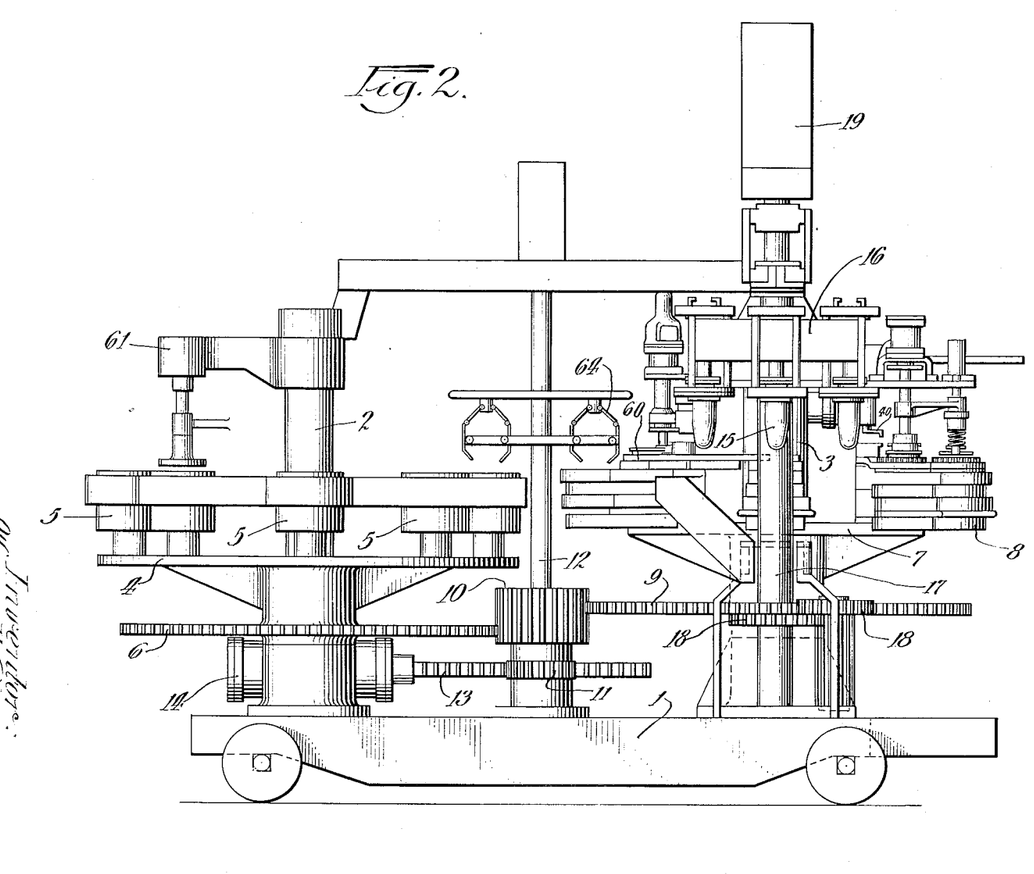
Fig. 2 is a view in side elevation.
Figure 3:
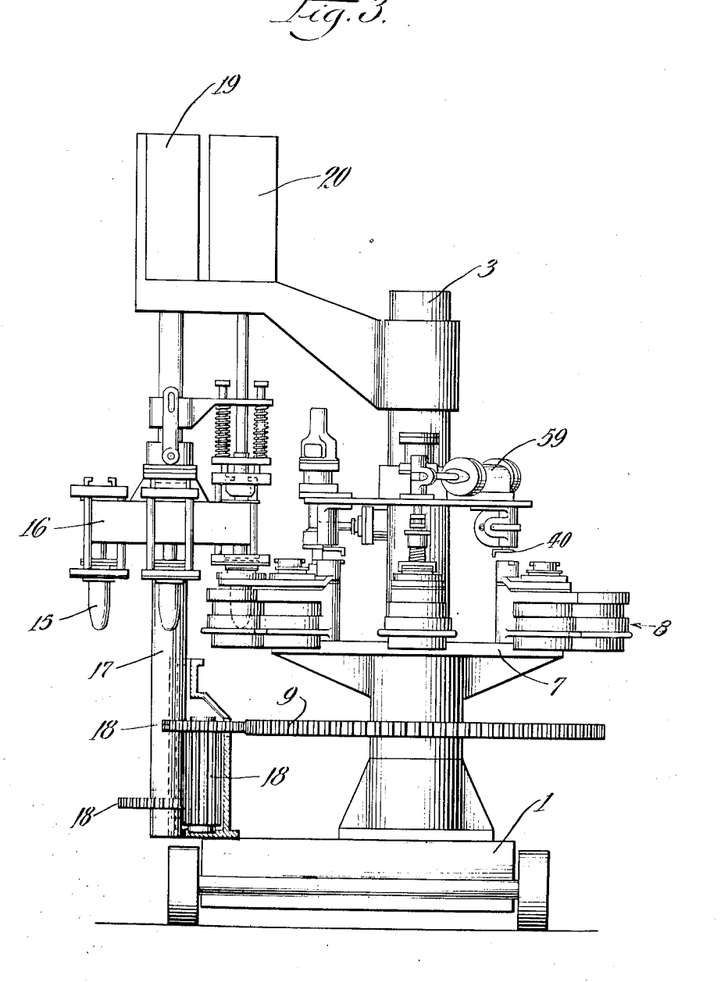
Fig. 3 is a view in end elevation.

At stage three there is located a cylinder 34 which is adapted to be operated by the same air pressure which operates the blowhead cylinder 61 (see Fig. 2); or the pressure lines 62 and 63 may be connected to the pressure lines which operate some other cylinder, in forward action immediately after the mould table comes to a stop and in return action immediately before the mould table starts. In either event the pipe lines are so connected that the piston head 35 is down as shown in Fig. 5 when the mould reaches stage three. The lug 36 on the arm 26 therefore slides over the head 35 as the mould comes to rest at stage three. As just stated, the cylinder 34 being connected to such air supply that its piston 34ᵃ is actuated in an upward direction immediately after the mould comes to rest at stage three, the head 35 will lift the lug 36 and raise the entire arm 26 carrying with it the sleeve 21.

At stage three there is located a crank 40 on a shaft 40ᵃ provided with a gear 41. The shaft 40ᵃ is located directly over the pin 27. This crank 40 is located at such a height that when the arm 26 has been lifted by the cylinder 34, the finger 40ᵇ on the end of the crank 40 will engage the lug 42 on the end of the arm 26 (see Figs. 5 and 7). A rack piston rod 43 operated by the cylinder 44 engages the gear 41 to rotate the arm 26 through an arc of approximately 100 degrees. This operates at stage three and serves to move the collar 21 from its position over the mould to a position where it will be out of the way. As the piston head 35 rises, air from the port 38 is admitted to the port 39 passing around the walls 37. From the port 39 air passes to the back of the cylinder 44 forcing the rack 43 forward and revolving the gear 41 and crank 40 as above described. As the pin 40ᵇ on the crank 40 is in contact with the lug 42 on the arm 26, the arm 26 will be turned in a clockwise direction substantially 100 degrees. This is sufficient to move the collar 21 from its position above the mould. As the arm 26 swings around, the lug 36 slides off the top of the head 35 and then the bottom of the hub 26ᵃ on the arm 26 rides on top of the locating pin 28. This serves to hold the arm 26 up above the mould, except when the collar 21 is in position over the mould.

Figure 11:
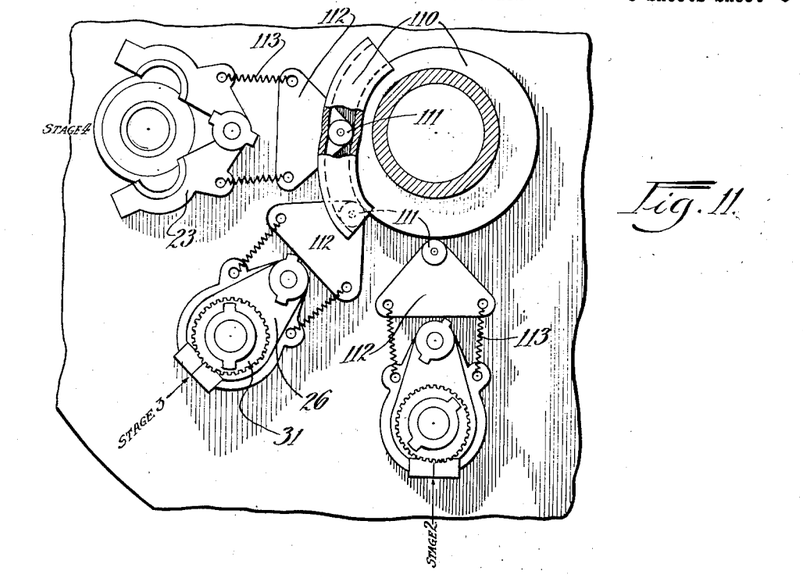
Fig. 11 is an enlarged fragmentary view showing a mechanism for opening the parison moulds preparatory to the transfer of a parison to the blowing apparatus.

The object in turning the arm 26 around through this arc of 100 degrees is to clear the way for the transfer attachment 64 (itself forming no part of the present invention) to act at stage four. As the mould passes from stage three to four (see Fig. 11) a cam 110 operates the cam roller 111 on the member 112 through the springs 113 to open the neck ring 23 to provide additional clearance for the transfer fingers 64 to descend at stage four and grasp the parison by the neck, lift it, and be ready to swing it around over the blow mould at the next movement of the table.

The arm 26 remains up and turned away from over the mould 8 during stages four, five and six.

At stage seven there is provided mechanism similar to that at stage three which operates to turn the arm 26 back again to its position over the mould 8. This mechanism need not be described in detail as its construction and operation is similar to that of stage three. It will suffice to say that 47 indicates a cylinder (see Fig. 5) similar to cylinder 44, and 45 and 46 indicate respectively cranks and gears similar to 40 and 41 at stage three. 45ᵃ and 45ᵇ indicate a shaft and pin respectively similar to shaft 40ᵃ and pin 40ᵇ at stage three. These parts operate at stage seven in the same manner as those described in connection with stage three to turn the arm 26 in a counterclockwise direction substantially 100 degrees to bring the collar 21 back again in position over the mould 8. As the arm 26 swings around, the base of the hub 26ᵃ again rides on the locating pin 28 until the collar 21 is exactly over the mould when the slot 30 in the back of the hub also lines up with the locating pin 28 and allows the arm 26 to settle down in place.

Figure 6:
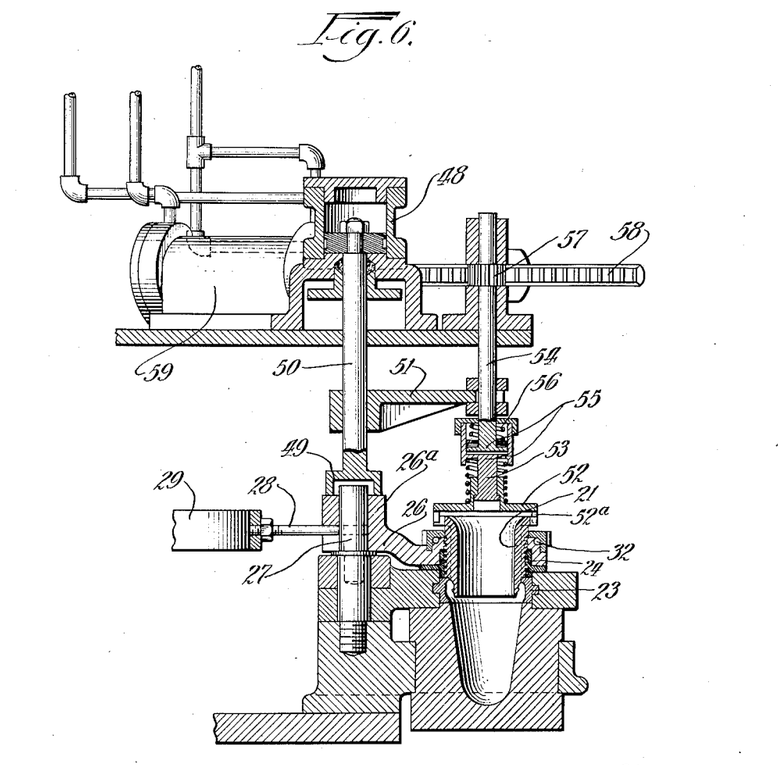
Fig. 6 is a view taken as indicated by the line 6—6 of Fig. 4.
Figures 9, 10:
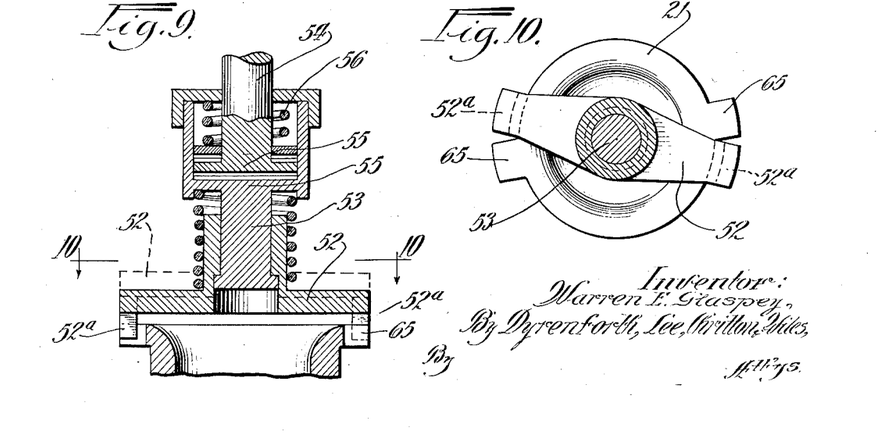
Fig. 9 is a fragmentary enlarged vertical sectional view of the spider and associated parts shown in Fig. 6.
Fig. 10 is a view as indicated by the line 10 of Fig. 9.

At stage eight means are provided for again moving the collar 21 down into place so that it will be ready for the next casting. 48 indicates a cylinder (see Fig. 6) with a head 49 on the end of a piston rod 50 which serves to follow the arm 26 down to a firm seat on the neck ring 23. An arm 51 carried by the piston rod 50 serves to force the sleeve revolving mechanism down at the time. This sleeve revolving mechanism comprises a double crank 52 slidably mounted on a shaft 53. The shaft 53 (see Figs. 6, 9 and 10) is turned by a spindle 54 through the medium of two friction discs 55 held in contact by a spring 56. A gear slidably mounted on the spindle 54 is turned by a rack pinion 58 driven by cylinder 59. The purpose of this revolving mechanism is to screw the threaded sleeve 21 down to its seat on the neck ring 23. The friction discs 55 allow the rack 58 and spindle 54 to complete their stroke without screwing the threaded sleeve 21 down against the screw ring 23 with undue pressure.

In the operation of the device at stage eight (see Figs. 6, 9 and 10), the cylinder 48 actuates the piston head 49 downwardly. This head 49 coming in contact with the hub 26ᵃ of arm 26 will force it down to proper position if it did not settle down to this position at stage seven. The arm 51 on the piston rod 50 carries the sleeve revolving head down at the same time. The fingers 52ᵃ on the ends of the double crank 52 may strike on top of the lugs 65 when the sleeve revolving head first descends. In that event the spring 56 allows the double crank 52 to slide up on the shaft 53 temporarily; but as soon as the spindle 54 starts rotating the fingers 52ᵃ will slide off of the lug 65 and engage the sides of these lugs thus screwing the threaded sleeve 21 firmly down onto and into the neck ring 23 and preparing it for the next charge of molten glass at stage one.

Air line 63 (see Fig. 5) furnishes air pressure just before starting the mould table in its passage from one stage to the next and revolves all the cylinders, restoring them to their normal positions so that entire attachment may be ready to start a new cycle at the next stage.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible in view of the prior art.

What I claim as new, and desire to secure by Letters Patent, is:

1. In a machine of the character set forth; a rotatable table with a plurality of parison moulds, one of such moulds being located at each stage; means for rotating said table step by step to bring each of the moulds successively into position at each stage; a reciprocable plunger adjacent one stage adapted to press molten glass in the mould at said stage; a sleeve in conjunction with each mould adapted to embrace the plunger and provided with a male thread on its lower end, said sleeve adapted to fit in the neck of the mould; a swingable arm carrying said sleeve threaded therein, said arm adapted for swinging movement to move said sleeve from a position over the mould to a position to one side of the mould and vice versa; means adapted to engage the sleeve upon movement of the table to rotate the sleeve in its threaded mounting in the arm to unscrew the male threads from a glass blank after operation of the plunger; means for raising the arm and the sleeve carried thereby after said unscrewing; and means for swinging the arm to move the sleeve to a position to one side of the mould after said raising.

2. In a machine of the character set forth; a rotatable table with a plurality of parison moulds, one of such moulds being located at each stage; means for rotating said table step by step to bring each of the moulds successively into position at each stage; a reciprocable plunger adjacent one stage adapted to press molten glass in the mould at said stage; a sleeve in conjunction with each mould adapted to embrace the plunger and provided with a male thread on its lower end, said sleeve adapted to fit in the neck of the mould; a swingable arm carrying said sleeve threaded therein, said arm adapted for swinging movement to move said sleeve from a position over the mould to a position to one side of the mould and vice versa; means adapted to engage the sleeve upon movement of the table to rotate the sleeve in its threaded mounting in the arm to unscrew the male threads from a glass blank after operation of the plunger; means for raising the arm and the sleeve carried thereby after said unscrewing; means for swinging the arm to move the sleeve to a position to one side of the mould after said raising; means for again swinging the arm to bring the sleeve to a position over the mould; means for lowering the arm and sleeve; and means for again rotating the sleeve in its threaded mounting in the arm to lower its threaded end into the neck of the mould.

3. In a machine of the character set forth; a rotatable table with a plurality of parison moulds, one of such moulds being located at each stage; means for rotating said table step by step to bring each of the moulds successively into position at each stage; a reciprocable plunger adjacent one stage adapted to press molten glass in the mould at said stage; a sleeve in conjunction with each mould adapted to embrace the plunger and provided with a male thread on its lower end, said sleeve adapted to fit in the neck of the mould; a swingable arm carrying said sleeve threaded therein, said arm adapted for swinging movement to move said sleeve from a position over the mould to a position to one side of the mould and vice versa; means adapted to engage the sleeve upon movement of the table to rotate the sleeve in its threaded mounting in the arm to unscrew the male threads from a glass blank after operation of the plunger, said means including a collar surrounding the sleeve provided with gear teeth on its outer periphery, and a rack bar adjacent the table and provided with teeth adapted to mesh with the teeth of said collar upon movement of the table; means for raising the arm and the sleeve carried thereby after said unscrewing; and means for swinging the arm to move the sleeve to a position to one side of the mould after said raising.

4. In a machine of the character set forth; a rotatable table with a plurality of parison moulds, one of such moulds being located at each stage; means for rotating said table step by step to bring each of the moulds successively into position at each stage; a reciprocable plunger adjacent one stage adapted to press molten glass in the mould at said stage; a sleeve in conjunction with each mould adapted to embrace the plunger and provided with a male thread on its lower end, said sleeve adapted to fit in the neck of the mould; a swingable arm carrying said sleeve threaded therein, said arm adapted for swinging movement to move said sleeve from a position over the mould to a position to one side of the mould and vice versa; means adapted to engage the sleeve upon movement of the table to rotate the sleeve in its threaded mounting in the arm to unscrew the male threads from a glass blank after operation of the plunger, said means including a collar surrounding the sleeve provided with gear teeth on its outer periphery, and a rack bar adjacent the table and provided with teeth adapted to mesh with the teeth of said collar upon movement of the table; means for raising the arm and the sleeve carried thereby after said unscrewing; means for swinging the arm to move the sleeve to a position to one side of the mould after said raising; means for again swinging the arm to bring the sleeve to a position over the mould; means for lowering the arm and sleeve; and means for again rotating the sleeve in its threaded mounting in the arm to lower its threaded end into the neck of the mould.

5. In a machine of the character set forth; a rotatable table with a plurality of parison moulds, one of such moulds being located at each stage; means for rotating said table step by step to bring each of the moulds successively into position at each stage; a reciprocable plunger adjacent one stage adapted to press molten glass in the mould at said stage; a sleeve in conjunction with each mould adapted to embrace the plunger and provided with a male thread on its lower end, said sleeve adapted to fit in the neck of the mould; a swingable arm carrying said sleeve threaded therein, said arm adapted for swinging movement to move said sleeve from a position over the mould to a position to one side of the mould and vice versa; means adapted to engage the sleeve upon movement of the table to rotate the sleeve in its threaded mounting in the arm to unscrew the male threads from a glass blank after operation of the plunger; means for raising the arm and the sleeve carried thereby after said unscrewing, said means set in operation by movement of the table; and means for swinging the arm to move the sleeve to a position to one side of the mould after said raising, said means set in operation by movement of the table.

6. In a machine of the character set forth; a rotatable table with a plurality of parison moulds, one of such moulds being located at each stage; means for rotating said table step by step to bring each of the moulds successively into position at each stage; a reciprocable plunger adjacent one stage adapted to press molten glass in the mould at said stage; a sleeve in conjunction with each mould adapted to embrace the plunger and provided with a male thread on its lower end; said sleeve adapted to fit in the neck of the mould; a swingable arm carrying said sleeve threaded therein, said arm adapted for swinging movement to move said sleeve from a position over the mould to a position to one side of the mould and vice versa; means adapted to engage the sleeve upon movement of the table to rotate the sleeve in its threaded mounting in the arm to unscrew the male threads from a glass blank after operation of the plunger; means for raising the arm and the sleeve carried thereby after said unscrewing, said means set in operation by movement of the table; means for swinging the arm to move the sleeve to a position to one side of the mould after said raising, said means set in operation by movement of the table; means for again swinging the arm to bring the sleeve to a position over the mould, said means being set in operation by movement of the table; means for lowering the arm and sleeve, said means set in operation by movement of the table; and means for again rotating the sleeve in its threaded mounting in the arm to lower its threaded end into the neck of the mould, said means being set in operation by movement of the table.

7. In a machine of the character set forth; a rotatable table with a plurality of parison moulds, one of such moulds being located at each stage; means for rotating said table step by step to bring each of the moulds successively into position at each stage; a reciprocable plunger adjacent one stage adapted to press molten glass in the mould at said stage; a sleeve in conjunction with each mould adapted to embrace the plunger and provided with a male thread on its lower end, said sleeve adapted to fit in the neck of the mould; a swingable arm carrying said sleeve threaded therein, said arm adapted for swinging movement to move said sleeve from a position over the mould to a position to one side of the mould and vice versa; means adapted to engage the sleeve upon movement of the table to rotate the sleeve in its threaded mounting in the arm to unscrew the male threads from a glass blank after operation of the plunger; means for raising the arm and the sleeve carried thereby after said unscrewing; means for swinging the arm to move the sleeve to a position to one side of the mould after said raising; and means for again moving the sleeve into position in the neck of the mould.

8. In a machine of the character set forth; a rotatable table with a plurality of parison moulds, one of such moulds being located at each stage; means for rotating said table step by step to bring each of the moulds successively into position at each stage; a reciprocable plunger adjacent one stage adapted to press molten glass in the mould at said stage; a sleeve in conjunction with each mould adapted to embrace the plunger and provided with a male thread on its lower end, said sleeve adapted to fit in the neck of the mould; a swingable arm carrying said sleeve threaded therein, said arm adapted for swinging movement to move said sleeve from a position over the mould to a position to one side of the mould and vice versa; means adapted to engage the sleeve upon movement of the table to rotate the sleeve in its threaded mounting in the arm to unscrew the male threads from a glass blank after operation of the plunger, said means including a collar surrounding the sleeve provided with gear teeth on its outer periphery, and a rack bar adjacent the table and provided with teeth adapted to mesh with the teeth of said collar upon movement of the table; means for raising the arm and the sleeve carried thereby after said unscrewing; means for swinging the arm to move the sleeve to a position to one side of the mould after said raising; and means for moving the sleeve back into position in the neck of the mould.

9. In a machine of the character set forth; a rotatable table with a plurality of parison moulds, one of such moulds being located at each stage; means for rotating said table step by step to bring each of the moulds successively into position at each stage; a reciprocable plunger adjacent one stage adapted to press molten glass in the mould at said stage; a sleeve in conjunction with each mould adapted to embrace the plunger and provided with a male thread on its lower end, said sleeve adapted to fit in the neck of the mould; a swingable support for the sleeve, said support adapted for swinging movement to move the sleeve from a position over the mould to a position to one side of the mould and vice versa; means operated by movement of the table from stage to stage for raising the sleeve in said support; means for raising the support, said means set in operation by movement of the table from stage to stage; and means for swinging the support to move the sleeve to one side of the mould, said means set in operation by movement of the table from stage to stage.

10. In a machine of the character set forth; a rotatable table with a plurality of parison moulds, one of such moulds being located at each stage; means for rotating said table step by step to bring each of the moulds successively into position at each stage; a reciprocable plunger adjacent one stage adapted to press molten glass in the mould at said stage; a sleeve in conjunction with each mould adapted to embrace the plunger and provided with a male thread on its lower end, said sleeve adapted to fit in the neck of the mould; a swingable support for the sleeve, said support adapted for swinging movement to move the sleeve from a position over the mould to a position to one side of the mould and vice versa; means operated by movement of the table from stage to stage for raising the sleeve in said support; means for raising the support, said means set in operation by movement of the table from stage to stage; means for swinging the support to move the sleeve to one side of the mould, said means set in operation by movement of the table from stage to stage; means for again swinging the support to bring the sleeve to a position over the mould, said means set in operation by movement of the table from stage to stage; means for lowering the support and sleeve, said means set in operation by movement of the table from stage to stage; and means for again lowering the sleeve in the support to move it back into position in the neck of the mould, said means being set in operation by movement of the table from stage to stage.

In testimony whereof, I have hereunto set my hand this 16th day of May A. D. 1927.

WARREN E. GLASPEY.